Figure 1:
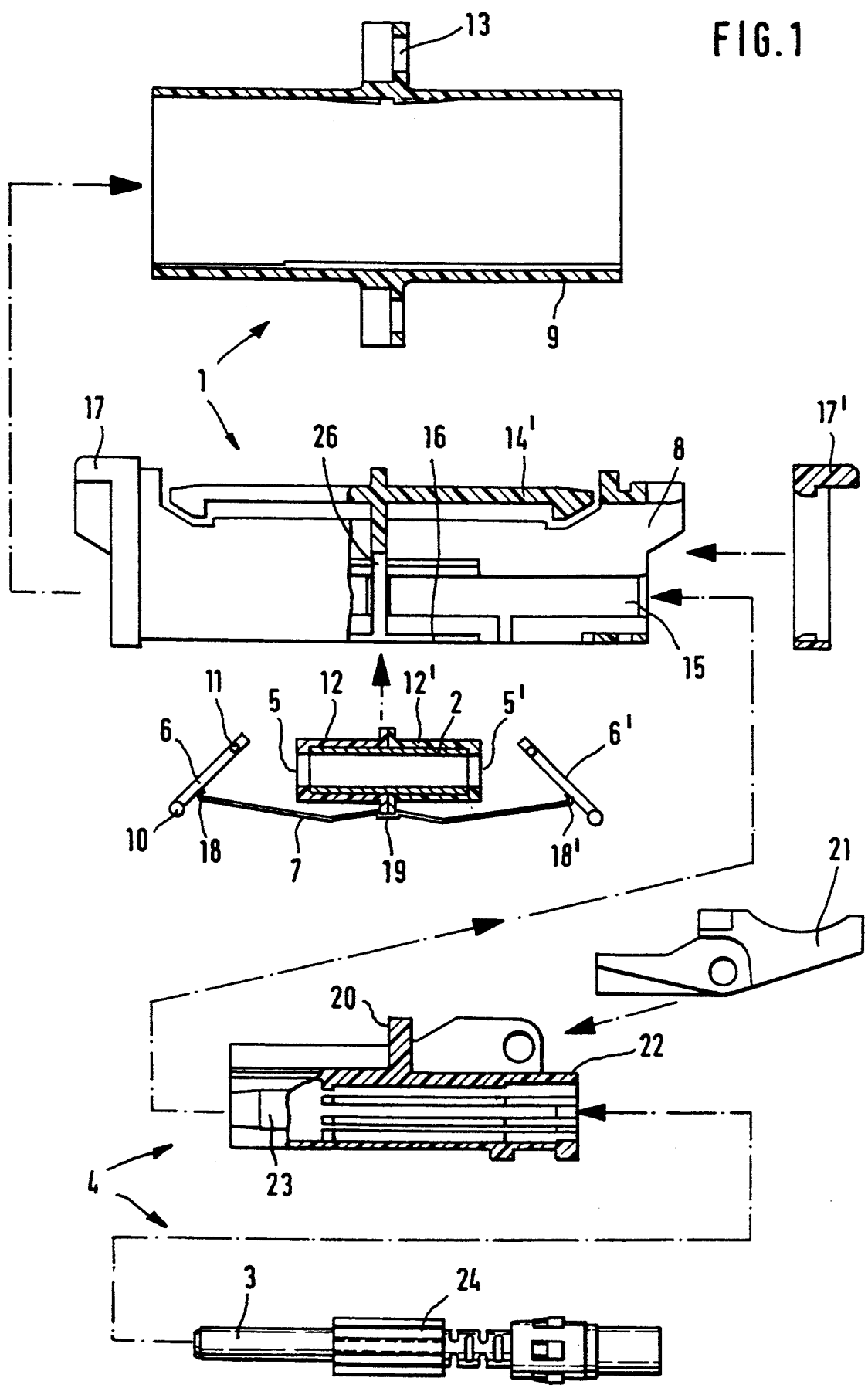

United States Patent [19]

Marazzi et al.

[11] Patent Number: 5,363,460
[45] Date of Patent: Nov. 8, 1994

[54] SLEEVE PORTION FOR AN OPTICAL FIBRE PLUG CONNECTOR

[75] Inventors: Silvio Marazzi, Cavigliano; Silverio De Marchi, Contra, both of Switzerland

[73] Assignee: Diamond SA, Losone, Switzerland

[21] Appl. No.: 155,765

[22] Filed: Nov. 23, 1993

[30] Foreign Application Priority Data

Nov. 26, 1992 [CH] Switzerland .................. 3621/92

[51] Int. Cl.⁵ ............................................. G02B 6/38
[52] U.S. Cl. ...................................... 385/70; 385/55; 385/77
[58] Field of Search .................. 385/70, 55, 60, 68, 385/72, 84, 78, 77, 81, 84, 134, 139, 140, 56, 67, 53, 56, 76

[56] References Cited

U.S. PATENT DOCUMENTS

| | | | |
|---|---|---|---|
| 4,645,295 | 2/1987 | Pronovost | 385/60 |
| 4,915,472 | 4/1990 | Liu | 385/55 |
| 5,212,752 | 5/1993 | Stephenson et al. | 385/84 |
| 5,263,106 | 11/1993 | Rosson | 385/72 |
| 5,265,183 | 11/1993 | Feng et al. | 385/77 |

OTHER PUBLICATIONS

2244 Research Disclosure (1987) Mar., No. 275, New York, New York, USA Van Goethem.
Vol. 6, No. 245 (P-159) [1123] Dec. 3, 1982, Connector for Optical Fiber, Japan.

*Primary Examiner*—John D. Lee
*Assistant Examiner*—Phan Thi Heartney
*Attorney, Agent, or Firm*—Shoemaker and Mattare, Ltd.

[57] ABSTRACT

The sleeve portion (1) contains a sleeve (2), the sleeve openings of which are overlain by moveable protective flaps (6, 6'). The protective flaps are placed under spring tension and are forced out of the closed position into an opened position during insertion of a plug ferrule (3) into the sleeve (2). The protective flaps have the effect that, when a plug is withdrawn out of the sleeve portion, no light can be emitted from the sleeve opening. The pivotable mounting of the protective flaps ensues between an inner sleeve housing (8) and an outer sleeve housing (9).

11 Claims, 4 Drawing Sheets

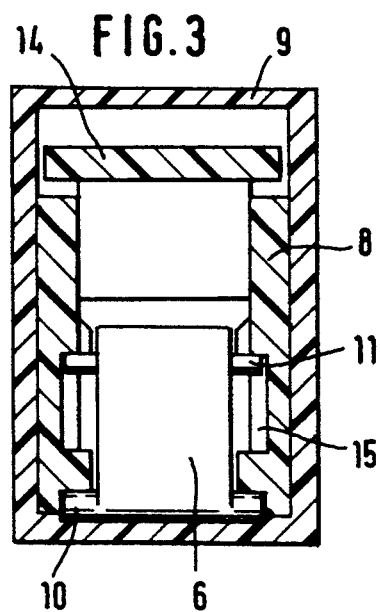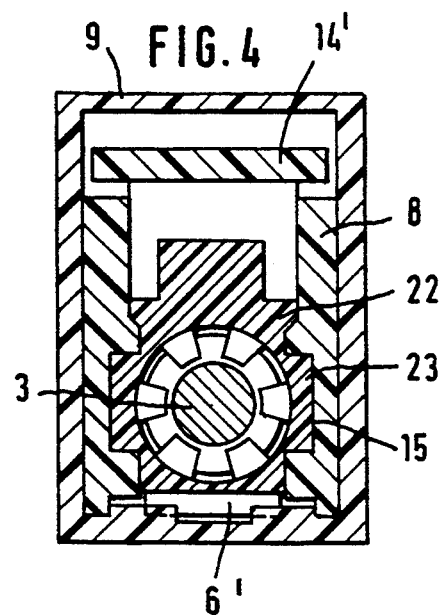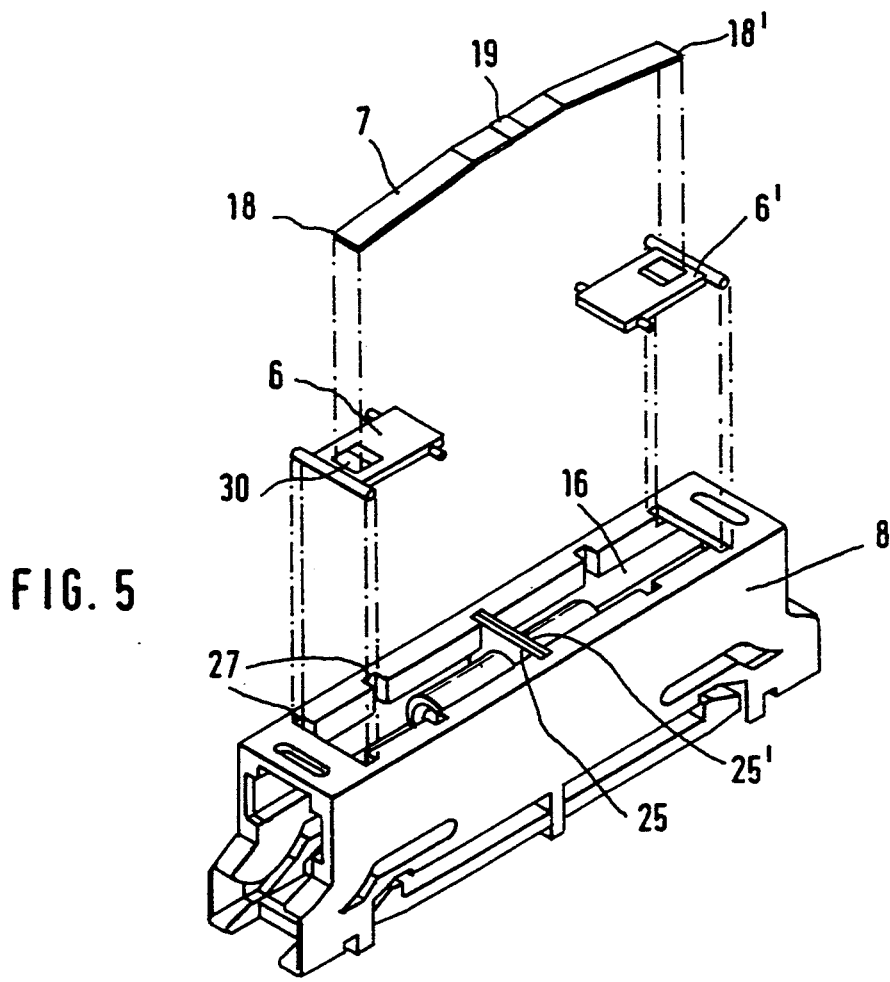

SLEEVE PORTION FOR AN OPTICAL FIBRE PLUG CONNECTOR

The invention concerns a sleeve portion for an optical fibre plug connector. These types of sleeve portions are mainly used as adaptors or middle portions for attachment on a housing wall.

The purpose of these types of sleeve portions is to protect the sleeve opening from contamination or from mechanical influences. Also, the emission of light from the sleeve portion when the plug ferrule is withdrawn should be prevented. If this light is laser light, eye injuries could result as soon as the light ray falls on the unprotected retina. The emission of light from the sleeve portion could also be undesirable for other technical reasons.

In JP-A-57/142 607, a connection sleeve for a photoelectric transducer is described in which the entrance opening for the optical fibre is closed off by a spring tensioned cover. On insertion of the fibre, the cover is displaced to the side. With a plug connector described in "Research Disclosure" No. 275, of March 1987, page 124, the sleeve opening is covered by a flexible disk which is pressed into a hollow space when the plug ferrule is inserted.

A problem with the known sleeve portions is that the assembly and mounting of the protective flaps is accompanied by considerable difficulties. The protective flaps must, in fact, fulfil their functions within the smallest off spaces, and they have, of necessity, very small dimensions amounting to a few millimeters. Thus, assembly is relatively laborious.

In addition, there is the requirement that the protective flap be as a rule tensioned by a separate spring. Only in this way will it be ensured that the protective flap remains in the closed position when the plug ferrule is withdrawn.

It is therefore a purpose of the invention to create a sleeve portion of the type mentioned in the introduction, with which the protective flap, with the highest degree of operating security, can be assembled and disassembled in the simplest way. According to the invention, this purpose is fulfilled with a sleeve portion described below. Since the protective flap is held and mounted to be able to pivot between both sleeve housings, it can be assembled and disassembled in a particularly simple way. There is no requirement for a separate axle or similar, as, for example, is the case with JP-A-57/142 607. The protective flap remains connected with the sleeve portion regardless, and will not be lost, and with operating problems it is easily accessible or replaceable at all times. Operating security is considerably increased because the protective flap is mounted to be able to pivot and because it is held in the closed position under spring tension. By this means, the protective flap automatically pivots back into the closed position as soon as the plug ferrule is withdrawn from the sleeve.

At the same time, it is particularly advantageous if the protective flap is held in the closed position at an angle which is inclined in relation to the centre axis of the sleeve and if it is able to be pivoted into the open position in the direction towards the sleeve opening. Through the inclined position, the protective flap must only carry out a relatively small pivoting motion into the open position, and the insertion resistance for the plug will only be slightly raised.

The protective flap is preferably tensioned into the closed position by a leaf spring. The leaf spring can be easily accommodated in the sleeve portion, and the spring force is easily sufficient to place the protective flap under tension.

The protective flap can possess lateral linkage lugs for pivotable mounting in the mounting positions formed by both the sleeve housings. It would also be conceivable without problems to mount the protective flap in guide grooves or the like. The protective flap can furthermore possess lateral limit stop lugs for limiting of the position when closed. With that, with regard to the forces involved, a particularity favourable inclined position of the protective flap can be selected. The protective flap can be formed approximately as a rectangle, since this will considerably simplify its lateral guidance and mounting. It could, without further problems, also be circular or possess a rounded form.

It is particularly advantageous if the inner sleeve housing has at least one opening in the housing wall through which the protective flap is able to be slid for assembly and disassembly, this opening being able to be closed off by the outer sleeve housing. This opening permits placement of the sleeve flap in the correct place in the most direct way, without difficult manipulation or auxiliary tools being necessary. Assembly can thus be easily automated.

The sleeve portion can possess a sleeve in which the plug ferrule is able to be inserted from both sides, a protective flap being arranged in front of each sleeve opening. Through that, the sleeve portion according to the invention can be used in many ways, since in principle it is of no consequence which of the inserted plugs carries the optical fibre which emits light. With any desired combination, it is reliably ensured that the sleeve opening is covered when the plug ferrule is withdrawn.

In the case of a double sided sleeve portion, both the protective flaps will preferably be tensioned in the closed position by a common leaf spring which is arranged beneath the sleeve in the sleeve portion. The leaf spring can, with that, be fixed in its position by a sleeve holder which is able to be inserted into the sleeve portion, and indeed through an opening in the inner sleeve portion, in a similar way to the protective flap itself.

Figure 2:
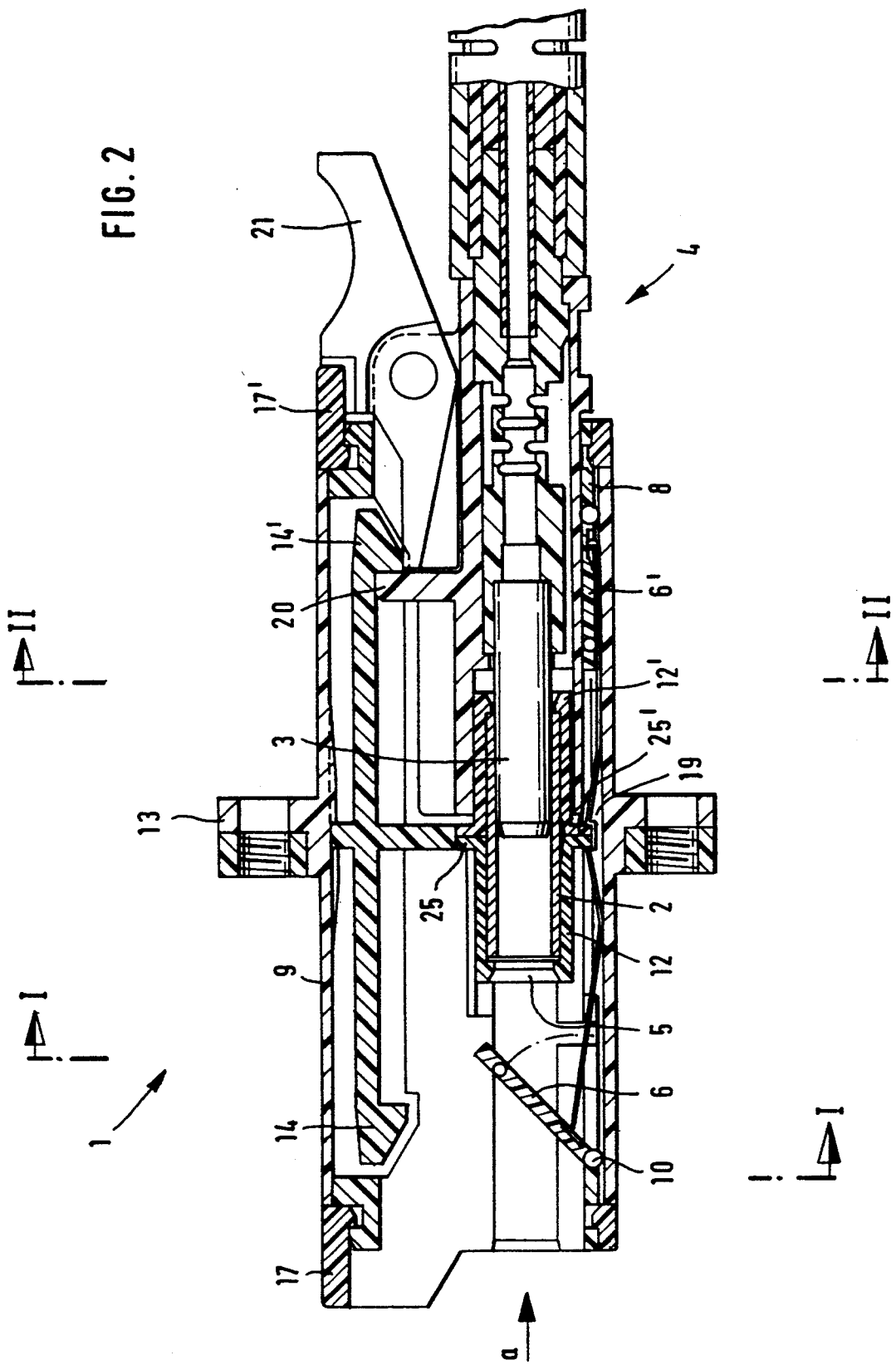
Figure 6:
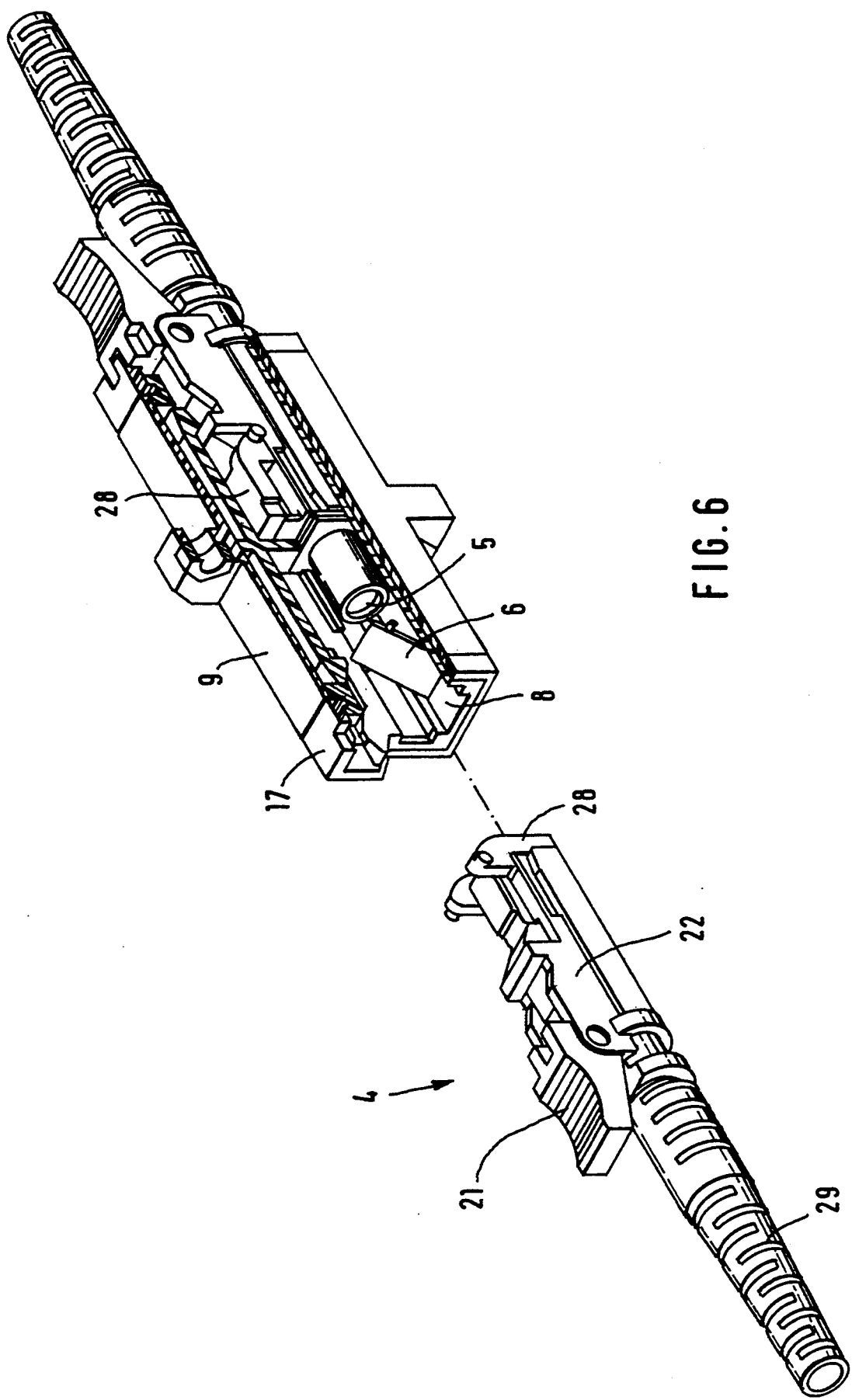

Further advantages and individual features arise from following description of an embodiment, and from the drawings, wherein:

FIG. 1 is a plug connector dismantled down to its individual components with a sleeve portion according to the invention, FIG. 2 is the plug connector according to FIG. 1 in an assembled condition, FIG. 3 is a cross section through the plane I—I according to FIG. 2, FIG. 4 is a cross section through the plane II—II according to FIG. 2, FIG. 5 is a perspective representation of the inner sleeve portion with a view of the underside, and FIG. 6 is a perspective representation of a plug connector with partly cutaway sleeve portion.

FIG. 1 shows the individual components of a typical plug connector having a receptacle 1 and a plug 4. The receptacle 1 is in addition designed to accommodate two plugs 4 of the same type from both sides, each plug ferrule 3 penetrating into a socket 2 and thereby being centered in relation to the plug ferrule lying opposite.

The sleeve portion 1 has an outer receptacle 9 with a flange 13 by which the sleeve portion can be screwed, for example, onto a housing wall. The inner sleeve portion 8 is inserted into the outer sleeve portion 9. As is made clear particularly in FIGS. 3 and 4, both the inner and outer sleeve housings have an approximately box shaped, rectangular cross section. Fixing of the inner sleeve housing in the outer sleeve housing ensues through snap-on attachable end frames 17 and 17', as can in particular be seen in FIG. 2.

The inner sleeve housing 8 has sprung locking catches 14, 14' on its upper side which serve to retain the plug in the inserted position. Guide grooves 15 are arranged on the side walls of the inner sleeve housing 8 which serve to accept the plug in the correct orientation. An opening 16 is provided on the underside of the inner sleeve housing 8 through which the socket 2, with the associated socket holder 12, 12', can be inserted.

The socket is preferably floatingly mounted in the socket holder, both portions of which have flange type edge sections 25, 25' which are oriented towards each other. On the inner sleeve housing, lateral guide grooves 26 receive both the edge sections. A leaf spring 7, the ends 18, 18' of which engage on the protective flap 6, 6', is arranged beneath the socket holder. The middle section 19 of the leaf spring is formed as a clasp in which both the edge sections 25, 25' of the socket holder engage. In this way, the position of the leaf spring 7 is fixed in the sleeve housing.

The configuration of both the protective flaps 6, 6' can be particularly seen in FIG. 3. Each protective flap has an approximately rectangular form and is equipped with lateral linkage lugs 10 which are held between the inner and outer sleeve housings. Apart from that, each protective flap has lateral limit stop lugs 11, which engage laterally in the guide grooves 15 and which limit the inclined position when the flaps are closed. This inclined position in relation to the optical axis also causes the light emission to be reflected away, and provide a high return loss. Now, the guide grooves open laterally in the direction of pivoting in such a way that each protective flap can assume a position parallel to the centre axis of the sleeve. The distance of the mounting position for the linkage lugs 10 from the sleeve openings 5, respectively 5' is so selected that the free ends of each protective flap lie, in their open position, just in front of a sleeve opening.

The plug 4, with its plug ferrule 3, can basically have any desired construction. In the embodiment shown, it comprises in principle a rectangular plug housing 22 which is provided with lateral guide rails 23. These guide rails fit into the guide grooves 15 on the sleeve portion. The locking catches 14, and 14' can engage in a respective locking bar 20 on the upper portion of the plug housing. A releasing lever 21 arranged on the plug housing serves to raise the locking catch and thus to release the locking device again. A ferrule holder 24 is stamped into the plug housing 22, said ferrule holder 24 being connected firmly with the optical fibre cable, and with the plug ferrule 3, which are not shown in any greater detail here.

FIG. 2 shows the plug connector in an assembled condition, a plug 4 having been inserted into the right side, the left side remaining free. Both ends 18, 18' of the leaf spring engage, freely moveable, on the protective flaps 6 and 6'. If no plug is inserted into the sleeve portion, the sleeve opening 5, seen from the direction of insertion a, remains covered. A light ray emitted from the inserted plug 4 will thus be reflected away by the protective flap 6.

If now a plug 4 is inserted into the sleeve portion, the front portion of the plug ferrule 3 will thus run up against the protective flap and will press it, countering the force of the leaf spring, downwards with a pivoting movement until it has been forced back completely beneath the plane of the plug housing 22. This position is visible on the right side of FIG. 2, or in FIG. 4. As soon as the plug has reached its end position, the locking catch 14 will engage behind the locking bar 20. In order to withdraw the plug, first the releasing lever 21 must be activated. The protective flap will in each case, under the tension force of the spring, move in the direction of the closed position, as the plug permits it, until the final closed position is reached.

The mounting of the socket 2, as shown, is particularly advantageous, especially when combined with the leaf spring and with the protective flaps. This mounting could also possess advantages independent from the protective flaps. With the exception of the socket 3 and the plug ferrule 2, all other components are preferably manufactured from a plastic material. The plug ferrule and the socket could be made from a hard metal, ceramic or, if transmission loss is of lesser significance, from a plastic material.

In FIG. 5, an assembly sequence of a sleeve portion according to the invention is shown. An opening 16, which extends practically along the entire length of the sleeve housing, is visible on the underside of the inner sleeve portion 8. The width of the opening approximately corresponds to the width of both protective flaps 6, 6'. The linkage lugs 10 and the limit stop lugs 11 of the protective flaps are introduced via lateral grooves 27. Likewise visible here are the already inserted flange type edge sections 25, 25' of the sleeve holder. These edge sections engage, in their mounted condition, with the middle clasp section 19 of the leaf spring 7.

The ends 18, 18' of the leaf spring are bent down and move without fixed connection in the openings 30 on the protective flaps. After placing both the protective flaps 6, 6' into the inner sleeve portion 8, the leaf spring 7 is placed upon them and subsequently the entire unit is slid into the outer sleeve housing 9. This procedure permits relatively simple automation.

In FIG. 6, a plug connector with a sleeve portion according to the invention is once again represented. Both the plugs 4 are likewise equipped with a protective flap 28, which automatically flaps up during insertion into the plug. Kinking protection is suggested with 29, which protects the area of transition between the optical fibre cable and the plug 4.

Inasmuch as the invention is subject to modifications and variations, the foregoing description and accompanying drawings should not be regarded as limiting the invention, which is defined by the following claims and various combinations thereof.

We claim:

1. In a fiber optical plug connector receptacle having at least one socket with an open end for receiving a ferrule of a plug which can be inserted into the receptacle, the receptacle having a protective flap movably mounted in front of the opening, said flap having a deployed position at least partially covering the socket opening and a stowed position in uncovering the opening, the improvement wherein the receptacle comprises an outer sleeve housing and an inner sleeve housing which is slid into the outer sleeve housing, and the protective flap is held between the sleeve housings and is mounted so that it can pivot between said positions.

2. The invention of claim 1, wherein the socket has two open ends so that a plug ferrule can be inserted into the socket from either end, and further comprising a protective flap arranged in front of each open end.

3. The invention of claim 2, wherein both said flaps are biased toward their respective deployed positions by a common leaf spring disposed beneath the socket in the receptacle.

4. The invention of claim 2, wherein the socket is mounted in a socket holder which can be slid into the inner sleeve housing, and the leaf spring is retained in position by the socket holder.

5. The invention of claim 4, wherein the socket holder has two components, having opposed lateral flanges, and the leaf spring has a middle section in which both flanges engages.

6. The invention of claim 1, wherein the protective flap has lateral linkage lugs arranged on a pivot axis, and the inner sleeve housing has means for receiving said lugs.

7. The invention of claim 6, wherein the protective flap has lateral limit stops for preventing the flap from moving past its closed position.

8. The invention of claim 7, wherein the protective flap is approximately rectangular.

9. The invention of claim 1, further comprising a leaf spring biasing said flap toward said deployed position.

10. The invention of claim 1, wherein the receptacle has a longitudinal axis, and the flap, in its deployed position, lies at an angle inclined with respect to said longitudinal axis, and can pivot toward its stowed position by moving towards the socket opening.

11. The invention of claim 1, wherein the inner sleeve housing has a wall with at least one aperture therein, and the flap can slide through the aperture for assembly and disassembly, and the aperture can be closed off by the outer housing.

* * * * *